United States Patent Office 2,843,635
Patented July 15, 1958

2,843,635
WATER-SOLUBLE AMMONIUM PENTA-CHLOROPHENATE

John W. Pennington, Newport, Monmouthshire, England, assignor to Monsanto Chemicals Limited, London, England, a British company No Drawing. Application January 25, 1957
Serial No. 636,236

Claims priority, application Great Britain
January 25, 1956

5 Claims. (Cl. 260—623)

This invention relates to a water-soluble ammonium pentachlorophenate and to a process for its preparation.

Ammonium pentachlorophenate is useful as a preservative for rubber latex, and can be added to rubber latex for this purpose as an aqueous solution. An aqueous solution of ammonium pentachlorophenate can be obtained by dissolving powdered pentachlorophenol in aqueous ammonia, but the dissolution is not easy to effect, and if special equipment is used to assist it—for instance if a ball mill is employed—corrosion problems arise. Moreover the solutions obtained are not satisfactory if they are to be kept for a time before use, as they tend to deposit free pentachlorophenol on standing. It would be much more satisfactory to have a solid ammonium pentachlorophenate which is readily soluble in water, in which it can be dissolved immediately before use as a preservative.

Normal processes for making solid ammonium pentachlorophenate lead to a material which is impure and not completely soluble in water. For instance, ammonium pentachlorophenate can be prepared by dissolving pentachlorophenol in an organic solvent, for example, benzene or ether, and treating the solution with the appropriate quantity of ammonia gas: this precipitates ammonium pentachlorophenate, which can be filtered or centrifuged off and the residual solvent removed by evaporation. The product however contains free pentachlorophenol as impurity, is not completely water-soluble, and accordingly is not entirely satisfactory for incorporation in rubber latex.

This invention is concerned with a simple and practicable process by which ammonium pentachlorophenate can be prepared in a valuable form in which it has not hitherto been obtained, namely as a completely water-soluble solid. It has been found that ammonium pentachlorophenate can be obtained in such a form by condensing vapourised pentachlorophenol in the presence of excess gaseous ammonia. This process has the further advantage that it is possible to employ as starting material a crude or technical pentachlorophenol without introducing its impurities into the product.

The ammonium pentachlorophenate of the invention is accordingly one which is completely water-soluble, and the process for preparing it is one in which vapourised pentachlorophenol is condensed in the presence of excess gaseous ammonia.

In practice the pentachlorophenol starting material is heated and vapourised in a stream of ammonia gase which can be diluted with nitrogen or another inert gas if desired, and the vapours are removed and condensed. A convenient way to carry out the process is to blow ammonia gas through molten pentachlorophenol, which is preferably maintained at about 200° C. Sufficient ammonia is supplied to provide an excess over the quantity required to combine with all the vapourised pentachlorophenol, and the excess ammonia can be recycled to the pentachlorophenol vapouriser.

Association of the pentachlorophenol with ammonia to give ammonia pentachlorophenate appears to take place at the condensation, and probably in the vapour state little association occurs. Indeed it is mainly due to the ready dissociation of ammonium pentachlorophenate that the above-mentioned difficulties in its preparation in a reasonably pure state are encountered.

The condenser needs to be of such a form that excess ammonia and any diluent gas have ready egress and the crystals of ammonium pentachlorophenate which accumulate can be easily collected. A box condenser in which the vapours are deflected against a series of baffle plates can be used. The process can be carried out as a continuous one if desired, and where such box condensers are employed, two or more can be used in parallel, so that one can be isolated and the product can be collected from it, while the other or others are working. Alternatively the vapours can be condensed by directing them on to a water-cooled rotating drum.

The invention is illustrated by the following example.

Example

Technical pentachlorophenol (100 g.) was placed in a flask and heated to 190–210° C. Ammonia gas at room temperature was passed beneath the surface of the molten pentachlorophenol at such a rate that no entrainment of liquid occurred, and the temperature of the pentachlorophenol was maintained at about 200° C. The vapours in the flask were led off to an air-cooled condenser consisting of a large box containing multiple baffles, and having an exit for excess ammonia gas.

The passage of ammonia gas was discontinued when a molten residue of about 5 g. remained in the flask. The condenser was then opened and about 100 g. of colourless fluffy crystals of ammonium pentachlorophenate were recovered from the interior. These crystals were readily and completely soluble in water, and sublimed without residue on heating.

What is claimed is:

1. The product consisting essentially of ammonium pentachlorophenate which is obtained by condensing vaporized pentachlorophenol in the presence of excess ammonia gas.

2. A process for the preparation of ammonium pentachlorophenate, in which vapourised pentachlorophenol is condensed in the presence of excess gaseous ammonia.

3. A process according to claim 2, in which pentachlorophenol is heated and vapourised in a stream of ammonia gas and the vapours are removed and condensed.

4. A process according to claim 3, in which ammonia gas is blown through molten pentachlorophenol.

5. A process according to claim 4, in which the pentachlorophenol is maintained at about 200° C.

References Cited in the file of this patent
UNITED STATES PATENTS 2,350,322    Berl et al. _____ June 6, 1944

OTHER REFERENCES

Biltz et al.: Ber. deut. Chem., vol. 37 (1904), page 4019 (1 page).